(12) United States Patent
Chianura et al.

(10) Patent No.: US 12,735,266 B2
(45) Date of Patent: Sep. 15, 2026

(54) VIBRATING APPARATUS AND CORRESPONDING METHOD FOR CONVEYING OBJECTS

(71) Applicant: I.M.A. INDUSTRIA MACCHINE AUTOMATICHE S.P.A., Ozzano Dell'Emilia (IT)

(72) Inventors: Mattia Chianura, Ozzano Dell'Emilia (IT); Gabriele Gabusi, Ozzano Dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 262 days.

(21) Appl. No.: 18/283,043

(22) PCT Filed: Feb. 25, 2022

(86) PCT No.: PCT/IT2022/050034

§ 371 (c)(1),
(2) Date: Sep. 20, 2023

(87) PCT Pub. No.: WO2022/201207

PCT Pub. Date: Sep. 29, 2022

(65) Prior Publication Data

US 2024/0166448 A1 May 23, 2024

(30) Foreign Application Priority Data

Mar. 22, 2021 (IT) ........................ 102021000006770

(51) Int. Cl.
*B65G 27/24* (2006.01)
*B65G 27/00* (2006.01)

(52) U.S. Cl.
CPC ...... *B65G 27/24* (2013.01); *B65G 2812/0312* (2013.01); *B65G 2812/0344* (2013.01); *B65G 2812/0384* (2013.01)

(58) Field of Classification Search
None
See application file for complete search history.

(56) References Cited

U.S. PATENT DOCUMENTS 4,705,156 A * 11/1987 Boling ............... B65G 47/1457 198/443
6,457,577 B1 10/2002 Ikeda et al.
(Continued)

FOREIGN PATENT DOCUMENTS

CN 103086125 A * 5/2013 ............. B65G 27/24
CN 110562675 A * 12/2019 ......... B65G 47/1421
(Continued)

OTHER PUBLICATIONS

International Search Report and Written Opinion of PCT/IT2022/050034 dated Jun. 22, 2022, 13 pages.

*Primary Examiner* — Gene O Crawford
*Assistant Examiner* — Muhammad Awais
(74) *Attorney, Agent, or Firm* — Rankin, Hill & Clark LLP

(57) ABSTRACT

Vibrating apparatus (10) for automatically conveying objects (11) from a first position (12) to a second position (13) by means of vibration, comprising one or more conveying members (15) and a movement member (18), which is configured to be driven according to a vibrational motion in order to make said one or more conveying members (15) vibrate to cause a consequent forward motion by vibration of the objects (11).

18 Claims, 4 Drawing Sheets

(56) References Cited

U.S. PATENT DOCUMENTS 7,036,653 B2 * 5/2006 Reznik .................. B65G 27/04
198/401
2002/0125109 A1 * 9/2002 Ikeda .................... B65G 27/30
198/752.1
2008/0149537 A1 * 6/2008 Burkhard ................. B07B 1/42
209/225
2014/0041987 A1 * 2/2014 Kimura ................ B07B 13/113
198/348
2016/0244266 A1 * 8/2016 Bott ......................... G01H 3/10
2018/0044116 A1 * 2/2018 Kawai ................... H02K 33/02
2021/0016973 A1 * 1/2021 Helfenstein ........... B65G 27/08

FOREIGN PATENT DOCUMENTS

EP 3521215 A1 * 8/2019 ............. B65G 27/02
EP 3656707 A1 5/2020
KR 20120127210 A * 11/2012 ............. B65G 27/24
KR 20200089522 A * 7/2020 ........... B65G 49/061
WO WO-2018069819 A1 * 4/2018 ............. B65G 27/32
WO WO2018176137 A1 10/2018

* cited by examiner

VIBRATING APPARATUS AND CORRESPONDING METHOD FOR CONVEYING OBJECTS

FIELD OF THE INVENTION

The present invention concerns a vibrating apparatus and a corresponding method for conveying objects, especially of reduced mass, for example in the chemical, cosmetic and/or pharmaceutical sectors, such as bottles, flasks, caps, metal rings, or other objects of similar sizes, from an entry position to an exit position, along a predefined path. The vibrating apparatus according to the present invention comprises a conveying member which is made to vibrate by generating a determinate ordered forward motion of the objects disposed on its base surface. In particular, the vibrating apparatus according to the present invention is moved by using magnetic fields, thus allowing a movement that does not generate friction, and therefore allowing it to be used even in aseptic, sterile or sterilized environments. The objects can be conveyed both in an ordered and an unordered manner.

BACKGROUND OF THE INVENTION

Vibrating apparatuses for conveying objects are known, in particular of small sizes, for example in the chemical, cosmetic and/or pharmaceutical sectors, such as for example bottles, flasks, caps, metal rings, or other objects of similar sizes, from an entry position, for example associated with a first processing station of a production line, to an exit position, for example associated with a second processing station, along a predefined feed path.

Each known vibrating apparatus normally comprises one or more conveying members with which movement members are associated, which impart thereon a vibrational motion, that is, which produces vibrations, to obtain a forward motion of the objects along the feed path.

In particular, an apparatus is known in which the movement members consist of one or more coils mounted on a fixed frame and configured to generate a vibrational motion of one or more magnets associated with them and connected to the conveying members, which are mounted on the frame by means of elastic elements. In this known apparatus, the conveying members are supported and constrained to the fixed frame by the elastic elements and, when they are electrically excited, the coils impart to the conveying members themselves an alternating motion, substantially arcuate, which is in any case limited by the elastic elements.

Another vibrating apparatus known in the state of the art is described in the Chinese patent document CN 110562675 A, in which a plurality of linear motors are provided, configured to determine a vibrational motion able to orient a plurality of small-sized objects according to a desired orientation.

All known vibrating apparatuses, however, have the disadvantage that they cause friction, with the inevitable more or less accentuated production of particulate matter, which is always to be avoided, especially in the chemical, cosmetic and/or pharmaceutical sectors.

Moreover, each vibrating conveyor, in the design phase, is suitably sized on the basis of the objects that have to be moved and therefore of the particular vibrational motion to be imparted to the conveying member. In particular, the mechanical connection elements between the fixed frame and the conveying members, for example the elastic elements as above, have to be suitably sized.

Therefore, another disadvantage of known vibrating apparatuses is that they are very rigid in their design and manufacture. In fact, if the vibrational motion, or one or more of its parameters, were to be changed, such as speed, acceleration, amplitude and/or frequency of the oscillations to be transmitted to the conveying member, for example according to the size and/or weight of the objects to be moved, a person of skill in the art would have to carry out interventions in a mixed way, both on the control logic (software) and also on the mechanical parts (hardware), with consequent production stoppage and increased operating costs.

Furthermore, in known vibrating apparatuses, since the conveying member is connected to the frame, in order to prevent the vibrations from being transmitted to the floor and to other surrounding apparatuses, the frame must necessarily be provided with a very strong base and adequate damping members must be provided. In fact, at times the mass of the frame can be several times, up to 8-10 times, greater than the mass of the conveying members.

One purpose of the present invention is to provide a vibrating apparatus and to perfect a corresponding method which are simple, and which do not produce particulates, so that they can also and above all be used in aseptic, sterile or sterilized environments.

Another purpose of the present invention is to provide a vibrating apparatus which is very versatile and/or modular, so that it can be easily sized according to the production capacity required and which can also easily adapt to the spaces available for its installation.

Another purpose of the present invention is to provide a vibrating apparatus which, when the conveying members comprise two or more modules connected to each other, does not require precise mechanical workings and the consequent excessive costs, in order to align the various modules, especially the first and the last of them.

Another purpose of the present invention is to provide a vibrating apparatus with very low moving masses and in which the vibrations produced to move the conveying member are absorbed inside the apparatus itself, without needing bulky frames and heavy and/or complex devices for damping the vibrations.

Another purpose of the present invention is to provide a vibrating apparatus and perfect a corresponding method in which the parameters relating to the vibrational motion can be set and/or are variable as desired and in a simple manner, even after the construction of the apparatus itself and also when the sizes and/or weight of the objects to be conveyed change, or when it is desired to give them a different type of feed.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a vibrating apparatus according to the present invention for conveying objects from a first position to a second position by means of vibration, comprises a conveying member configured to make the objects advance along a feed path and a movement member associated with the conveying member and configured to be driven according to a vibrational motion to make the conveying member vibrate, in such a way that the objects are made to advance along the feed path by vibration. Please note that the feed of the objects along such path can occur both in an ordered manner, for example according to one or more rows, and also in an unordered manner, for example in bulk.

In accordance with one aspect of the present invention, the movement member comprises a mobile body magnetically coupled to a base body. The mobile body is configured to be driven according to the vibrational motion, moving on the base body without contact, so that the objects move from the first position to the second position by vibration while the conveying member is made to vibrate by the mobile body.

In accordance with another aspect of the present invention, magnetic means or electrical energizing means are disposed in the mobile body, and electrical energizing means or magnetic means are coherently disposed in the base body. The electrical energizing means are configured to selectively generate one or more magnetic fields in order to influence the magnetic means and cause a controlled reciprocal movement between the magnetic means and the electrical energizing means.

In accordance with one embodiment, at least one stator having a magnetic unit for generating a first magnetic field is associated with the base body, and at least a second magnetic unit is associated with the mobile body to generate a magnetic field to interact magnetically with the first magnetic field generated by the stator. The first and second magnetic units form the magnetic means as above.

In accordance with another aspect of the present invention, the vibrating apparatus also comprises control means configured to energize, selectively and in a coordinated manner, the electrical energizing means in order to produce the vibrational motion between the electrical energizing means and the magnetic means.

In accordance with one aspect of the present invention, the base body and the mobile body together form an actuation member, commonly known by the name "planar motor".

Advantageously, according to the present invention, the movement member, that is, the planar motor, can be made to vibrate according to a vibrational motion that causes the objects to advance by vibration, without contact—and therefore without friction—between the base body and the mobile body, unlike the solutions known in the state of the art in which the conveying member does not provide planar motors, or in any case such motors are not driven with a vibrational motion.

In accordance with another aspect of the present invention, the conveying member is an integral part of the mobile body, or it is separated and distanced from the mobile body but made integral with the latter by means of connection means. In this way, the vibrational motion is transferred to the conveying member.

According to one embodiment, in accordance with another aspect of the present invention, when the conveying member is an integral part of the mobile body, the conveying member is provided with a housing in which the mobile body is inserted.

In accordance with another aspect of the present invention, the control means are of the electronic and programmable type, so that it is possible to program, or if necessary, reprogram, one or more laws of motion of the vibrational motion as above in a simple way, as a function of parameters associated with the objects and/or the forward motion.

In accordance with another aspect of the present invention, a same conveying member is associated with two or more of the mobile bodies.

In accordance with another aspect of the present invention, the conveying member comprises a surface configured to support the objects allowing them to be positioned and fed, the surface being inclined, preferably downward, with respect to a horizontal plane. For example, the surface can be inclined by up to about 2°, advantageously up to about 0.5°.

Furthermore, the vibrational motion has a frequency comprised between about 20 Hz and about 100 Hz, and an amplitude comprised between about 0.05 mm and about 0.3 mm.

In accordance with another aspect of the present invention, the vibrational motion comprises at least one component in the vertical direction.

In accordance with another aspect of the present invention, the vibrational motion occurs along a rectilinear path, in an alternating forward-backward mode, and/or along a closed curvilinear path.

In accordance with another aspect of the present invention, a method to convey objects from a first position to a second position by means of vibration comprises the steps of preparing a movement member and a conveying member associated therewith; and driving the movement member according to a vibrational motion to make the conveying member vibrate, in such a way that the objects are made to advance along a feed path by vibration. According to one aspect of the present invention, the method also comprises the step of moving without contact, according to the vibrational motion, the mobile body of the movement member which is magnetically coupled to the base body of the movement member itself, in order to generate the vibrational movement, so that the objects move from the first position to the second position by vibration while the conveying member is made to vibrate by the mobile body.

In accordance with another aspect of the present invention, all the objects advance together along the feed path by the same distance in the same period of time.

In accordance with another aspect of the present invention, the objects are caps.

In accordance with another aspect of the present invention, the method also comprises a programming step, in which one or more laws of motion of the vibrational motion are programmed, or if necessary reprogrammed, in the control means, as a function of parameters associated with the objects and/or with the forward motion.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
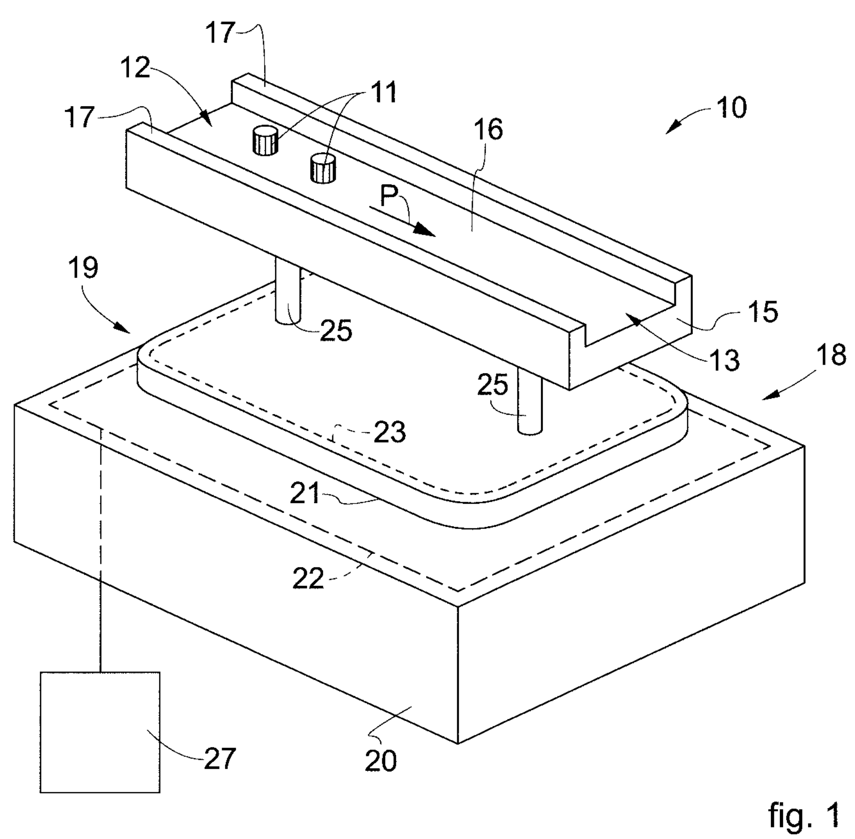
FIG. 1 is a perspective view of a vibrating apparatus according to the present invention in accordance with a first embodiment.

We must clarify that in the present description and in the claims, the terms horizontal, lower, upper, high and low, with their declinations, have the sole function of better illustrating the present invention with reference to the drawings and must not be in any way used to limit the scope of the invention itself, or the field of protection defined by the attached claims. For example, by the term horizontal we mean an axis or a plane that can be either parallel to the line of the horizon, or inclined, even by several degrees, for example up to 20°, with respect to the latter.

In addition, the persons of skill in the art will recognize that certain sizes or characteristics in the drawings may have been enlarged, deformed or shown in an unconventional or non-proportional way to provide a version of the present invention that is easier to understand. When sizes and/or values are specified in the following description, the sizes and/or values are provided for illustrative purposes only and must not be construed as limiting the scope of protection of the present invention, unless such sizes and/or values are present in the attached claims. Furthermore, all the intervals reported here shall be understood to include the extremes, including those that report an interval "between" two values, unless otherwise indicated.

To facilitate comprehension, the same reference numbers have been used, where possible, to identify identical common elements in the drawings. It is understood that elements and characteristics of one embodiment can be conveniently combined or incorporated into other embodiments without further clarifications.

DETAILED DESCRIPTION OF SOME EMBODIMENTS

With reference to FIGS. 1 to 6, a vibrating apparatus 10 according to the present invention is configured to convey objects 11, for example in the chemical, cosmetic and/or pharmaceutical sectors, such as bottles, flasks, caps, metal rings, or other objects of similar sizes, from a first position, that is, an entry position 12, for example associated with a first processing station, or a feed position, not shown in the drawings, to a second position, that is, an exit position 13, for example associated with a second processing station, also not shown in the drawings.

The vibrating apparatus 10 comprises one or more conveying members 15, each shaped in such a way as to define a path P between the entry position 12 and the exit position 13, which in the example provided here is rectilinear, but which could have any other shape whatsoever.

Figure 3:
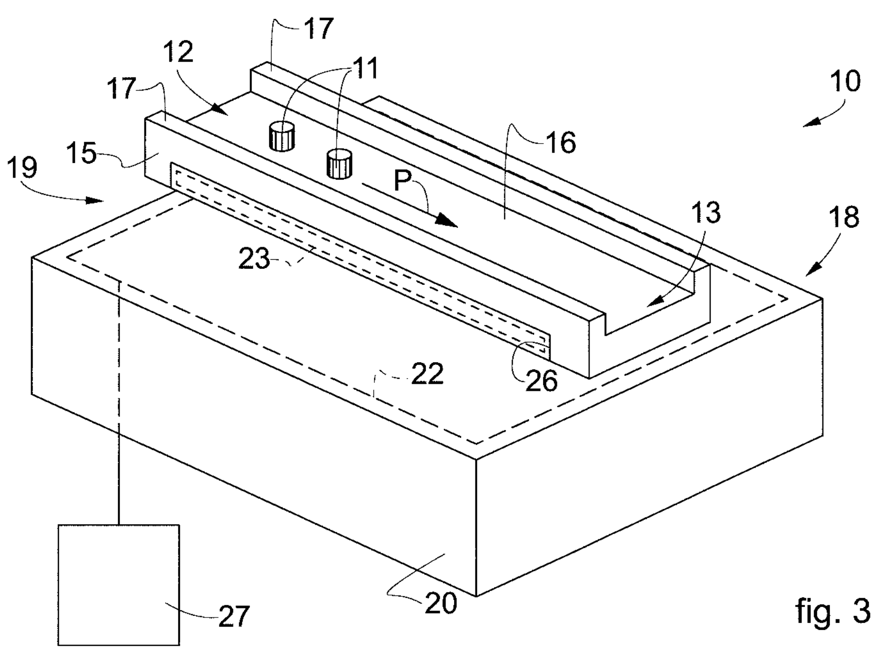
FIG. 3 is a perspective view of a vibrating apparatus according to the present invention in accordance with a second embodiment.
Figure 4:
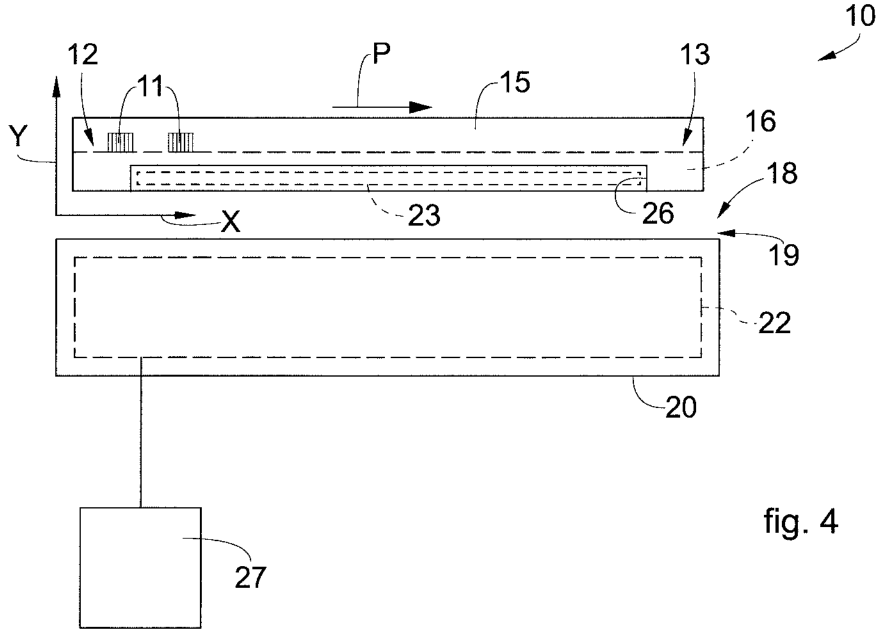
FIG. 4 is a lateral view of the vibrating apparatus of FIG. 3.
Figure 5:
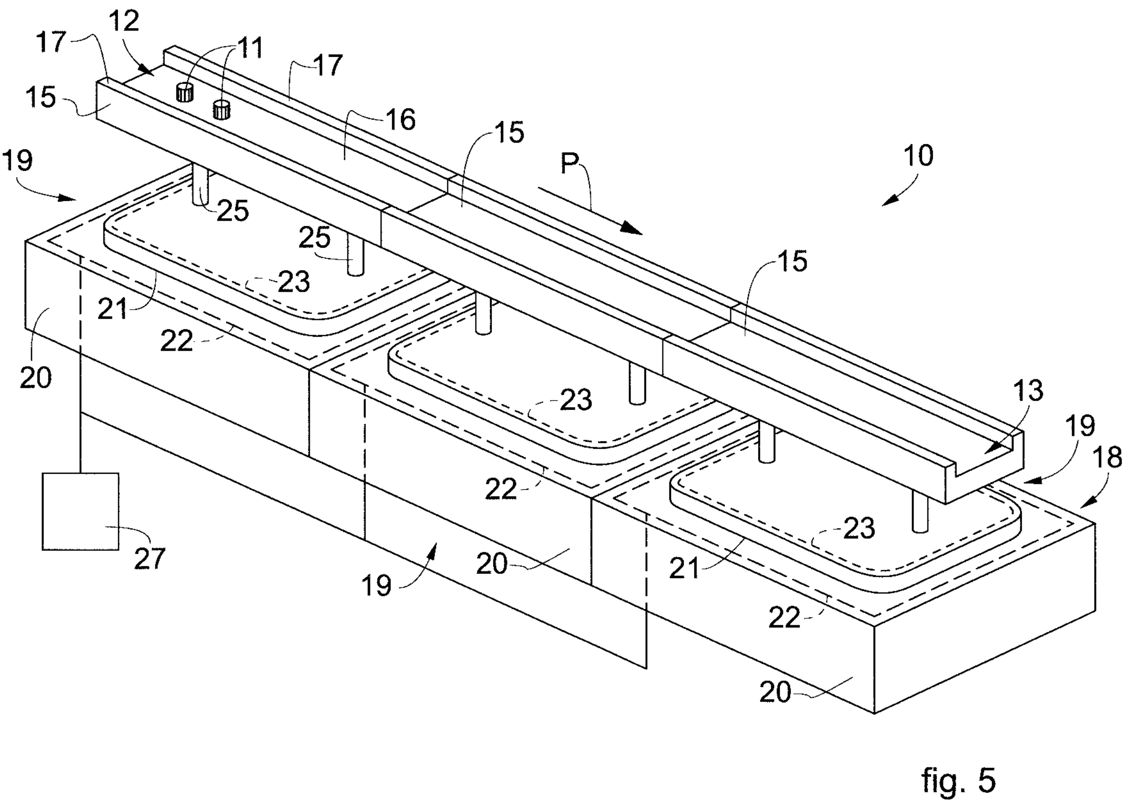
FIG. 5 is a perspective view of a vibrating apparatus according to the present invention in accordance with a third embodiment.
Figure 6:
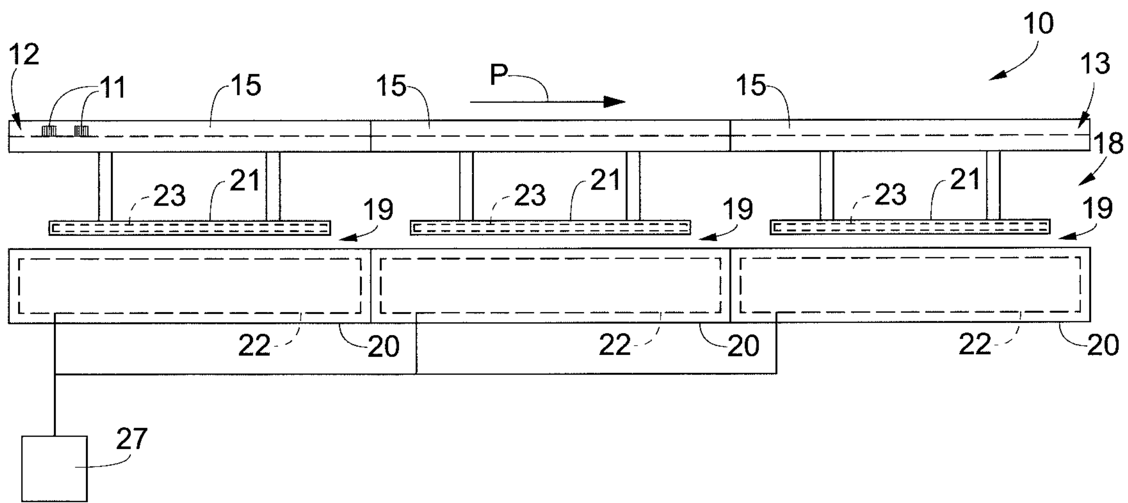
FIG. 6 is a lateral view of the vibrating apparatus of FIG. 5.

In particular, in the embodiments shown in FIGS. 1 to 4, there is only one conveying member 15, while in the embodiment shown in FIGS. 5 and 6 there are three conveying members 15, disposed one as a continuation of the other.

It is clear that the number of conveying members 15 can be even higher, as a function of their longitudinal extension and of the length of the path P.

In one embodiment, not shown in the drawings, the path P, after an initial segment common to all the objects 11, could be divided into a plurality of individual paths, parallel to, or diverging from, each other, in which one or more objects 11 are conveyed. Therefore, in the present description and in the attached claims, by path P we mean any path followed by each of the objects 11 to be conveyed, which can even be different from one object 11 to another, although it can be provided that for one or more segments of the path, for example initial, intermediate, and/or final, the path of several objects 11 can be a common one.

Each conveying member 15 comprises a base 16, having a surface, for example flat, on which the objects 11 rest, and two lateral walls 17 that guide the objects 11 along the path P and prevent them from falling laterally.

In one embodiment of the present invention, not shown in the drawings, the base 16 of each conveying member 15 can be shaped in such a way as to obtain a plurality of tracks or paths for guiding the objects 11 along the path P. Furthermore, the vibrating apparatus 10 comprises one or more movement members 18 configured to impart a vibrational motion to each conveying member 15, which will be described in greater detail below, which causes a forward movement of the objects 11 along the path P.

In accordance with one aspect of the present invention, each movement member 18 can be configured as a planar motor 19, or at least a part of it, which could also be of a type known per se.

In particular, as is known, a planar motor 19 substantially comprises a base body 20, configured to remain stationary in a determinate position, and an associated mobile body 21, mobile with respect to the base body 20 without coming into contact with the latter, that is, with a reciprocal "contactless" motion.

In the embodiment described here, one or more electrical energizing members 22 are disposed inside the base body 20, which for example consist of a plurality of coils or windings, and are configured to selectively generate one or more determinate magnetic fields. Inside the mobile body 21 there are one or more magnetic members 23, consisting for example of a plurality of permanent magnets, configured to interact with the magnetic fields generated by the electrical energizing members 22. The reciprocal movement between the base body 20 and the mobile body 21 occurs due to the interaction between the electrical energizing members 22, when they are suitably energized, and the magnetic members 23, that is, by means of reciprocal magnetic attraction and repulsion.

In another alternative embodiment, not shown in the drawings, but easily understood by the person of skill in the art, the electrical energizing members 22 could be disposed in the mobile body 21 and the magnetic members 23 could be disposed in the base body 20.

Each conveying member 15 is connected to a corresponding mobile body 21, for example so as to be integral with each other, so that when the first moves, the second also moves in unison.

Figure 2:
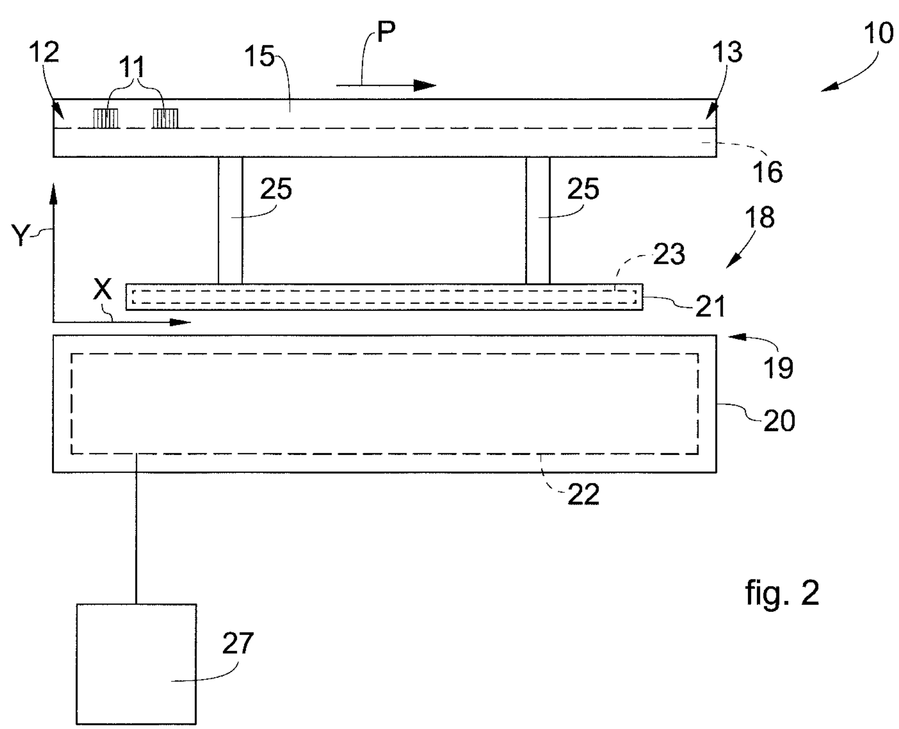
FIG. 2 is a lateral view of the vibrating apparatus of FIG. 1.

In the embodiments shown by way of example in FIGS. 1 and 2, respectively 5 and 6, the connection between the conveying member 15 and the mobile body 21 is made by means of connection or spacer bars 25.

On the other hand, in the embodiment shown by way of example in FIGS. 3 and 4, the conveying member 15 is shaped in such a way as to have a housing 26, in which there is inserted the mobile body 21, or at least the magnetic members 23, or, instead of the latter, the electrical energizing members 22.

In another alternative embodiment of the present invention, not shown in the drawings, the mobile part 21 of the planar motor 19 could replace the conveying member 15 and itself be shaped in such a way as to have lateral walls, tracks or paths which define the path P.

Furthermore, the vibrating apparatus 10 comprises a control unit 27, for example of the electronic and programmable type, connected to the movement members 18 and configured to selectively energize the electrical energizing members 22 of the latter, for example by acting on the electric current and/or electric voltage values that are supplied to them.

The control unit 27 can be of any known type whatsoever, or one that will be developed in the future, and is programmed, or if necessary reprogrammed, so that the electrical energizing members 22, in association with the magnetic members 23, create a vibrational motion of the conveying member 15, with desired parameters, which comprise at least the frequency and amplitude of the oscillations, according to one or more desired laws of motion, as will be described in detail below.

According to another embodiment, the upper surface of the base 16 of each conveying member 15 can be inclined by a determinate angle with respect to a horizontal plane, so that the entry position 12 is higher than the exit position 13, in order to facilitate the feed of the objects 11 along the path P.

Furthermore, in accordance with another embodiment, not shown in the drawings, each conveying member 15 can be connected to at least two mobile bodies 21, for example when the power of each planar motor 19 may not be sufficient to move a particularly heavy conveying member 15, also considering the weight of the objects 11 to be conveyed, or in order to guarantee greater stability to the conveying member 15 itself.

Furthermore, in accordance with another embodiment, not shown in the drawings, as a function of the power of the planar motor 19 and the moving masses, a single mobile body 21 could be connected to two or more conveying members 15, in order to make the movement of the latter uniform.

The vibrational movement allowed by the planar motor 19 can be performed in all six possible degrees of freedom that the conveying member 15 has in space. It should be noted that some coordinates can remain fixed while others move according to such vibrational motion. For example, also on the basis of what has been highlighted above, if the conveying members 15 are straight, the rotation according to an axis that lies in the horizontal plane would incline, even if only slightly, the same conveying members 15, favoring/changing/optimizing the motion of objects 11.

Figure 7:
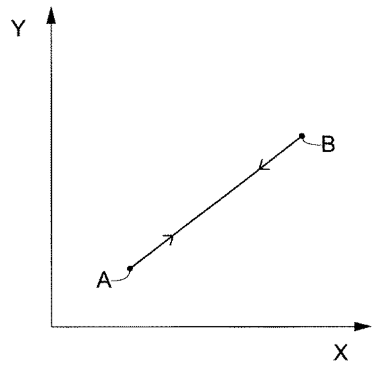
FIG. 7 is a graph of a first example vibrational motion of the vibrating apparatus.
Figure 8:
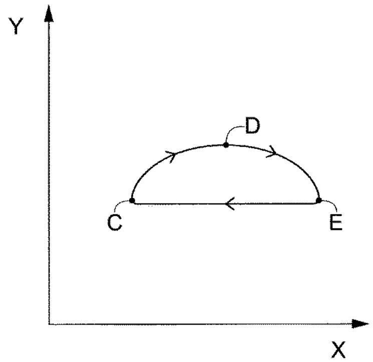
FIG. 8 is a graph of a second example vibrational motion of the vibrating apparatus.
Figure 9:
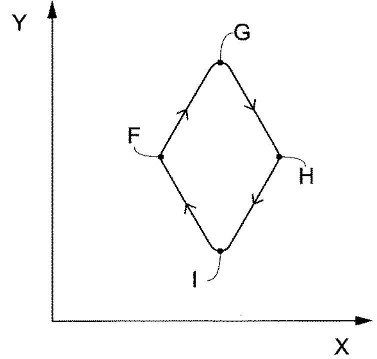
FIG. 9 is a graph of a third example vibrational motion of the vibrating apparatus.

FIGS. 7, 8 and 9 graphically shown some example vibrational movements that could be applied to the conveying member 15 by the movement members 18, controlled by the control unit 27, shown on a plane formed by an abscissa X, which represents the horizontal component of the longitudinal direction of feed along the path P, and by an ordinate Y, which is vertical and therefore represents the upward movement of the objects 11 with respect to the base 16, against the force of gravity. The disposition of the axes X and Y is indicated in FIGS. 2 and 4.

The purpose of the vibrational movement is to generate a sort of "micro-launch" of the objects 11, in such a way as to create a feed by vibration of the latter with respect to the longitudinal direction of the conveying member 15 along the path P.

Please note that the vibrational movement of the conveying member 15 is the same movement of the mobile body 21, to which the conveying member 15 is rigidly connected. As will be clear from FIGS. 7-9, the conveying member 15, and therefore the mobile body 21, performs a movement that is repeated cyclically in the same manner over time with respect to the underlying base body 20. Basically, regardless of the law of motion, the mobile body 21 does not advance with respect to the base body 20, but it moves with respect to the latter according to a cyclical vibrational movement that always makes it return to the same point.

As shown in FIG. 7, the path of the vibrational motion of the conveying member 15 could be a straight line, inclined upward and travelled alternately backward and forward, from a point A to a point B, and vice versa, creating a vibrational motion similar to the arcuate motion which generally occurs in vibrating conveyors of the state of the art. In the upward movement segment, an impulse is transmitted to the objects 11, so that, when the sense of the movement of the conveying member 15 changes, that is, when the latter returns to the starting position, the micro-launch of the objects 11 occurs, by inertia, in the direction of feed with respect to the base 16 of the conveying member 15. The return motion to the starting position occurs while the objects 11 are detached from the surface of the base 16 of the conveying member 15, and it allows the feed by vibration to materialize.

FIG. 8 shows a motion of the conveying member 15, substantially in an arc of a circle, and vice versa, with a first ascent phase, from point C to point D, a second forward descent phase, from point D to point E, and a third return phase, substantially rectilinear, from point E to point D. The micro-launch of the objects 11, with their consequent temporary detachment from the rest surface of the base 16, occurs in proximity to the end of the ascent phase of the conveying member 15. Whereas the feed of the objects 11 by vibration occurs during the descent phase and the return phase of the conveying member 15, possibly at a higher speed, the objects 11 returning in contact with the surface of the base 16 of the conveying member 15, at a point of the surface that is further forward compared to their starting position.

FIG. 9 shows a substantially rhomboidal motion of the conveying member 15, in which the starting point is represented by point F. Initially, there is an upward and forward motion, up to point G, followed by a downward and forward motion up to point H; then the return to the starting point F occurs, which comprises a first downward and backward motion, up to point I, and a second upward and backward motion, up to the starting point F. The micro-launch of the objects 11, with their consequent temporary detachment from the rest surface of the base 16, occurs in proximity to point G, after which, especially during the descent phase and the return of the conveying member 15 to the starting point F, possibly at a higher speed, the feed of the objects 11 by vibration occurs, the objects 11 returning in contact with the surface of the base 16 of the conveying member 15, at a point of the surface that is further forward compared to their starting position.

By way of a non-limiting indication, for example, the following three parameters can have the following values: a) downward inclination of the base 16 of the conveying member 15 and/or of the planar motor 19 with respect to a horizontal plane, up to about 2°, preferably up to about 0.5°; b) frequency of the vibrations produced by the planar motor 19, from about 20 Hz to about 100 Hz; c) amplitude of the vibrations from about 0.05 mm to about 0.3 mm. Furthermore, the parameters as above can be detected and/or measured with any suitable instrument or mean whatsoever, of a type known per se and not shown in the drawings, and possibly corrected if necessary.

It should be noted that, with the vibrating apparatus 10, based on the different masses and volumes of the objects 11, it is possible to modify the parameters in order to optimize their forward motion, substantially without intervening on the conveying members 15 and/or on the movement members 18, but simply by programming, or if necessary, reprogramming, in an adequate way, the control unit 27. Therefore, advantageously, one acts exclusively on the control unit 27 (software) and no longer on the mechanical parts (hardware), unlike known vibrating apparatuses in which at least a mixed intervention is required.

The parameters as above can be obtained by means of mathematical studies or, alternatively, or in addition, by means of experimental tests on the vibrating apparatus 10 itself, for example by varying the frequency and amplitude of the oscillations, and by detecting, for example with suitable sensors and/or other measurement instruments, such as high frequency video cameras, the actual vibrational motion of the objects 11.

Countless laws of motion can therefore be created, even complex and involving other degrees of freedom, in addition to the two described above (X, Y) for the movement of the conveying member 15.

It should also be noted that the vibrating apparatus 10 can be made by means of a plurality of modules which can be suitably associated with each other, so that the vibrating apparatus 10 itself becomes modular and sectional, and can therefore be adapted as a function of the length of the path P. Each of the modules as above can comprise one or more planar motors 19, possibly controlled by the control unit 27, and one or more conveying members 15.

The functioning of the vibrating apparatus 10 described so far, which corresponds to the method to use it, is as follows.

In a first step, or idle step, the conveying member 15 is stationary and the electrical energizing members 22, controlled by the control unit 27, are in a non-excited state, or in a stationary excited state, that is, with a generation of magnetic fields such as to keep the position of the magnetic members 23 constant over time.

In this position, the objects 11 are disposed in correspondence with the entry position 12, ready to be conveyed automatically toward the exit position 13.

In a subsequent second step, or conveying step, the control unit 27, programmed as a function of the type of vibrational motion to be transmitted to the conveying members 15, commands the energizing of the electrical energizing members 22 which make the corresponding magnetic members 23, and therefore the conveying members 15 associated therewith, vibrate, thus creating the feed of the objects 11 along the path P toward the exit position 13.

During the second step, on the base 16 of the first conveying member 15, in correspondence with the entry position 12, other objects 11 can be fed, thus creating a feed and an associated continuous conveying.

Some embodiments of the present invention, not shown in the drawings, can provide that upstream of the conveying members 15 there are selection members, of any type known per se, suitable to select the objects 11 before these are introduced into the first conveying member 15. For example, such selection members can be configured to only allow those objects 11 correctly oriented according to determinate criteria to pass toward the final conveying tracks, while the others, that is, those incorrectly oriented, will be rejected and possibly conveyed backward to be then reprocessed.

Similarly, there can be other conveying members, for example similar to the conveying members 15 and also associated with one or more planar motors 19, which orient the objects 11 upstream.

Advantageously, the vibrating apparatus 10 described heretofore works without friction, especially in the movement members 18, so that there is no generation of particulate matter, and therefore it is suitable for use in aseptic, sterile or sterilized environments, for example in the chemical, cosmetic and/or pharmaceutical sectors. Furthermore, in such environments there is often the need to use components with small sizes, with which to make more complex, or more voluminous, members or parts, not only because each part is simpler and cheaper, but above all because it is handled more easily by an operator, or especially by a robot. In the event that the conveying members 15 were made with several parts, a maximum limit could easily be imposed on each of their sizes. This would allow their use in the aseptic, sterile or sterilized environments as above, since, for example, each part could be sterilized in an autoclave and introduced into a sealed and isolated work environment through doors of the so-called rapid transfer type, known to the experts in the field as RTP (Rapid Transfer Port), of standardized sizes, which are usually not very large.

However, this presents the problem of the precision in producing the individual pieces that form the path P and of their repeatability. In practice, it often happens, in fact, that the resulting path P is not always exactly the same, or that there can be interference after the assembly of the individual pieces.

This problem occurs not only between the various pieces that constitute the path P, but above all in the interface between the last piece of the path P and the possible machine, not shown in the drawings and disposed downstream of the vibrating apparatus 10.

However, the above problem is advantageously solved by the vibrating apparatus 10, because there is the possibility of associating the various conveying members 15, which define the path P, with different planar motors 19, thus allowing to compensate for any errors and/or misalignments deriving from manufacturing, practically without any significant additional cost, because this can be done by simply programming, or reprogramming, even after installation, the control unit 27, that is, by modifying its programs (software), without intervening on the mechanical parts (hardware).

Furthermore, advantageously, the characteristics of the planar motors 19 and of the conveying members 15 make the vibrating apparatus 10 easy to size and adapt to the spaces available for its installation, as a function of the production capacity required.

Furthermore, advantageously, the very small moving masses and the vibrations produced to move each conveying member 15 are absorbed inside the vibrating apparatus 10 itself, so that it is not necessary to provide very thick and heavy support structures, or complex damping systems, so that the vibrations are not transmitted to the floor and other surrounding apparatuses.

In addition, the use of the planar motors 19 and their control also allows to compensate for any errors of alignment and orientation of the objects 11 and/or of the conveying members 15 along the path P.

It should be noted that the vibrating apparatus 10 is very versatile and, by simply programming, or if necessary, reprogramming, the control unit 27 in an appropriate manner, it allows to obtain one or more laws of motion of the vibrational motion described above, even very different from each other, and possibly even differentiated between one planar motor 19 and the other within the same apparatus 10.

It is clear that modifications and/or additions of parts or steps may be made to the vibrating apparatus 10 and to the corresponding method as described heretofore, without departing from the field and scope of the present invention as defined by the claims.

It is also clear that, although the present invention has been described with reference to some specific examples, a person of skill in the art shall certainly be able to achieve many other equivalent forms of vibrating apparatuses, all coming within the field of protection of the present invention defined by the claims.

In the following claims, the sole purpose of the references in brackets is to facilitate reading and they must not be considered as restrictive factors with regard to the field of protection defined by the claims.

The invention claimed is:

1. A vibrating apparatus for conveying objects, comprising:

a conveying member having a surface configured to support the objects;

a movement member operatively coupled to said conveying member and configured to impart vibrational motion to said conveying member to cause said conveying member, wherein said movement member comprises a base body, and a mobile body magnetically coupled to the base body and configured to move relative to the base body in a levitated manner without physical contact during operation, wherein the conveying member is mounted on the mobile body such that vibrational motion of the mobile body causes the conveying member to vibrate, wherein the conveying member is supported exclusively by the mobile body, whereby the objects advance on the surface of the conveying member along a feed path, moving from a first position to the second position relative to the surface of the conveying member.

2. The vibrating apparatus as in claim 1, wherein the mobile body comprises one of magnetic elements or electrical energizing components, and the base body comprises the other of electrical energizing components or magnetic elements arranged to interact with the mobile body, said electrical energizing components being configured to selectively generate one or more magnetic fields to cause controlled vibrational movement of the mobile body relative to the base body.

3. The vibrating apparatus as in claim 2, further comprising a controller, configured to selectively and coordinately energize said electrical energizing components to produce said vibrational movement.

4. The vibrating apparatus as in claim 1, wherein said conveying member is either integrally formed with the mobile body, or is mounted to said mobile body via one or more rigid connecting members.

5. The vibrating apparatus as in claim 1, wherein said conveying member is integrally formed with the mobile body and comprises a housing configured to receive said mobile body.

6. The vibrating apparatus as in claim 1, wherein the surface of the conveying member is inclined downwardly with respect to a horizontal plane in a direction from the first position to the second position.

7. The vibrating apparatus as in claim 1, wherein said vibrational motion has a frequency between 20 Hz and 100 Hz, and an amplitude between 0.05 mm and 0.3 mm.

8. The vibrating apparatus as in claim 1, wherein the base body functions as a stator and comprises at least one a magnetic unit configured to generate a magnetic field, and the mobile body functions as a rotor and comprises magnetic material configured to interact with the magnetic field generated by the stator to produce the vibrational movement of the mobile body.

9. The vibrating apparatus as in claim 1, wherein said vibrational motion comprises at least one vibrational displacement component in a direction substantially vertical.

10. The vibrating apparatus as in claim 1, wherein said vibrational motion occurs along a rectilinear path in an alternating forward-backward manner, and/or along a closed curvilinear path.

11. A method for conveying objects by vibration, comprising the steps of:

providing a movement member comprising a base body and a mobile body magnetically coupled to said base body and configured to move relative to said base body in a levitated manner without physical contact during operation;

mounting a conveying member on the mobile body, said conveying member having a surface configured to support the objects; and imparting a vibrational motion to the mobile body to cause the conveying member to vibrate, wherein the conveying member is supported exclusively by the mobile body, thereby said objects advance on the surface of the conveying member along a feed path from a first position to the second position relative to the surface of the conveying member.

12. The method as in claim 11, wherein the objects advance simultaneously along the feed in response to the vibration, each moving substantially an equal distance over equal time intervals.

13. Method as in claim 11, wherein said objects are caps.

14. A vibrating apparatus for conveying objects, comprising:

a conveying member having a surface configured to support the objects, a plurality of movement members arranged side-by-side, each movement member comprising a base body, and a mobile body magnetically coupled to the base body and configured to move relative to the base body in a levitated manner without physical contact during operation, wherein the conveying member is supported by the mobile bodies of the plurality of movement members such that vibrational motion of the mobile bodies causes the conveying member to vibrate, wherein the conveying member is supported exclusively by the mobile bodies, whereby the objects advance on the surface of the conveying member along a feed path, moving from a first position to a second position relative to the surface of the conveying member.

15. The vibrating apparatus as in claim 14, wherein said conveying member comprises a plurality of conveying segments, each conveying segment supported by a respective one of said mobile bodies.

16. The vibrating apparatus as in claim 14, further comprising a controller configured to coordinate vibrational motion of the mobile bodies to cause movement of the objects from the first position to the second position.

17. The vibrating apparatus as in claim 1, wherein said conveying member is configured such that vibrational motion thereof imparts kinetic energy to the objects for advancement along the feed path.

18. The method as in claim 11, wherein imparting the vibrational motion causes the conveying member to impart kinetic energy to the objects, thereby advancing the objects along the feed path.

* * * * *